United States Patent
Kirkwood

[15] 3,658,093
[45] Apr. 25, 1972

[54] VALVE HAVING EXPANDABLE SEALING MEANS

[72] Inventor: Creal E. Kirkwood, 1423 South 103rd East Avenue, Tulsa, Okla. 74128

[22] Filed: Aug. 12, 1970

[21] Appl. No.: 63,236

[52] U.S. Cl.................137/625.43, 251/173, 251/175, 137/312
[51] Int. Cl.................................F16k 39/06
[58] Field of Search............137/625.43, 312; 251/172, 173, 251/175

[56] References Cited

UNITED STATES PATENTS

| | | |
|---|---|---|
| 3,191,628 | 6/1965 | Kirkwood..................177/625.43 |
| 3,565,393 | 2/1971 | Trythall.....................251/172 |
| 2,433,732 | 12/1947 | Brown.......................251/175 |

FOREIGN PATENTS OR APPLICATIONS

| | | |
|---|---|---|
| 1,182,619 | 1/1959 | France......................251/175 |
| 651,114 | 3/1951 | Great Britain..............251/175 |

Primary Examiner—Harold W. Weakley
Attorney—Head & Johnson

[57] ABSTRACT

A valve having a body with an internal sealing surface and spaced apart port openings, the body having a shaft opening therein, a gate member rotatably supported in the body dividing the interior of the valve body into separate flow chambers and having a continuous gate sealing surface therearound in close proximity to the body sealing surface and having a continuous groove in the gate sealing surface, the gate member having a shaft portion extending externally of the body through the body shaft opening, the gate member having a passageway in the shaft portions communicating the continuous groove with the exterior of the valve body, an elongated expandable gasket member positioned in the groove in the gate sealing surface and having communication with the passageway, and means externally of the body of applying pressure by way of the passageway to the gasket member to expand the gasket member into sealing engagement with the body sealing surface.

11 Claims, 8 Drawing Figures

PATENTED APR 25 1972

INVENTOR
CREAL E. KIRKWOOD

BY Head & Johnson

ATTORNEYS

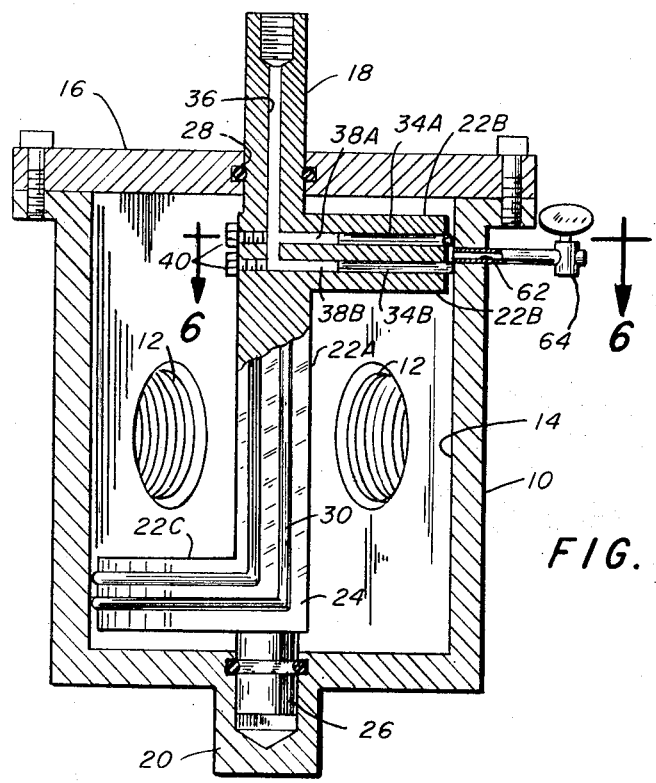
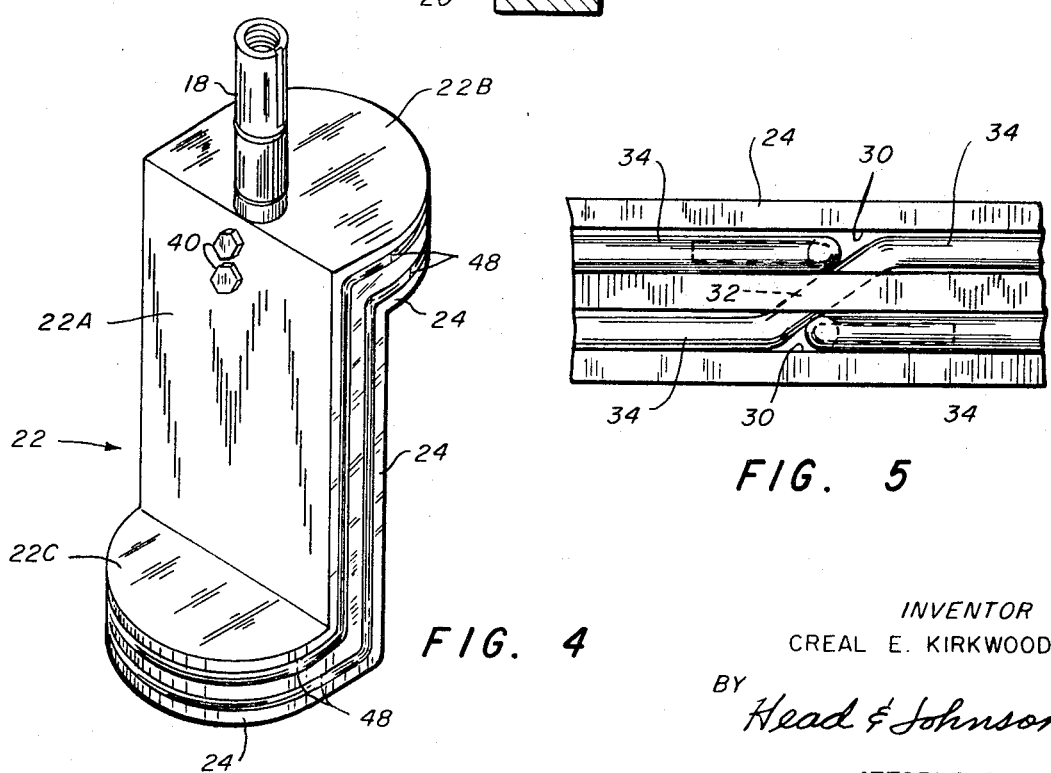

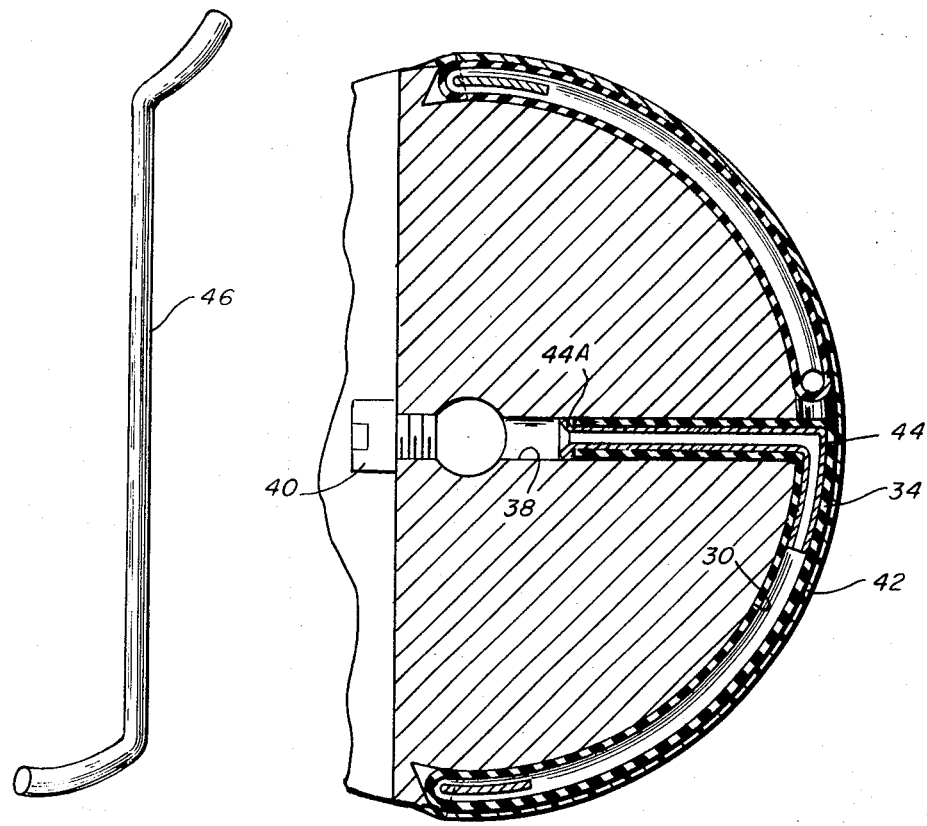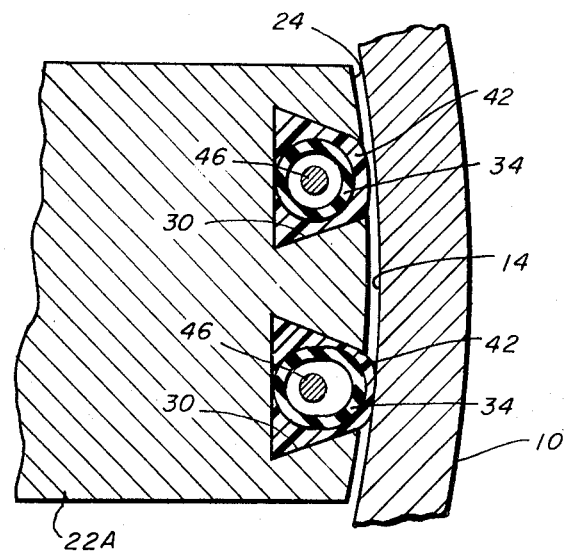
FIG. 8
FIG. 6
FIG. 7

3,658,093

VALVE HAVING EXPANDABLE SEALING MEANS

BACKGROUND, SUMMARY AND OBJECTS OF THE INVENTION

Most valves include some form of arrangement in which a gate member is movable within a valve body between positions to change fluid flow through the valve. In the simplest valve the gate member has two positions; in the open position fluid is permitted to flow through the valve and in the closed closed position fluid is prohibited from flowing through the valve. Other valves include multiple port arrangements wherein a gate member functions to change the arrangement of communication between ports in the valve so as to direct fluid flow as the gate member is moved from one position to another. An example of the later type of valve may be seen in U. S. Pat. No. 3,191,628. Whether the function of the valve is to stop fluid flow or to direct fluid flow from one port to another, some arrangement for effecting a sealing engagement between the gate member and the valve body is required. If the valve is relatively small such sealing contact may be effectively maintained by simple fitted engagement between the gate member and the valve body. When the size of the valve increases, however, the problem of maintaining a leakproof sealing engagement between the gate member and the valve body increases. This is particularly true in a multiport type valve referred to above. If contact pressure sufficient to ensure sealing exists between the gate member and the valve body the force necessary to move the gate member from one operable position to another becomes excessive.

This invention provides an arrangement for valves having means for increasing the sealing contact pressure between the gate member and the valve body when the gate is in an operable position and includes means of decreasing or completely removing such sealing contact pressure when it is desired to move the gate member from one operable position to another.

It is therefore an object of this invention to provide in a valve having a movable gate member improved means of effecting sealing engagement between the gate member and the valve body.

More particularly, an object of this invention is to provide a valve having a body and gate member movable therein, the gate member having a continuous groove in a sealing surface thereof, and an expandable sealing means in the groove functionable upon means controllable external of the valve for expanding to engage the body seating surface and for collapsing when it is desired to move the gate member from one operable position to another.

Still a more particular object of this invention is to provide a multiport valve having a valve body with a plurality of ports, a gate member rotatably movable in the valve body dividing the body into separate flow chambers, the gate member having a continuous sealing surface thereon engageable with the valve body and having a groove in such sealing surface, an expandable seal in the groove communicating with a passageway extending externally of the valve body, and means for imparting pressure to the expandable seal to effect sealing engagement with the valve body when the gate is in an operable position and for removing the pressure to cause the expandable seal to collapse when it is desired to move the gate member from one position to another.

These general objects as well as more particular objects of the invention will be fulfilled by the following description which sets forth an exemplary embodiment of the invention, and by the claims, the description of the exemplary embodiment being had with reference to the attached drawings.

DESCRIPTION OF VIEWS

FIG. 3 is a cross-sectional view taken along the line 3—3 of FIG. 1 with the gate member shown partially cut-away and with the hydraulic means of imparting fluid pressure to the gate member passageway not being shown.

FIG. 4 is an isometric view of the gate valve member.

FIG. 5 is a partial enlarged view of a portion of the gate member showing the point on the sealing surface at which the continuous resilient tubing crosses from one groove to another.

FIG. 6 is a cross-sectional view of the gate member taken along the line 6—6 of FIG. 3.

FIG. 7 is an enlarged cross-sectional view of a portion of the gate member showing the spaced apart sealing means and showing the upper sealing means as it would appear in collapsed condition and the lower sealing means as it would appear in expanded, sealing condition.

FIG. 8 is a Z-shaped rod element which is received within portions of resilient tubing to serve as a reinforcement of the seal member.

DETAILED DESCRIPTION

Figure 1:
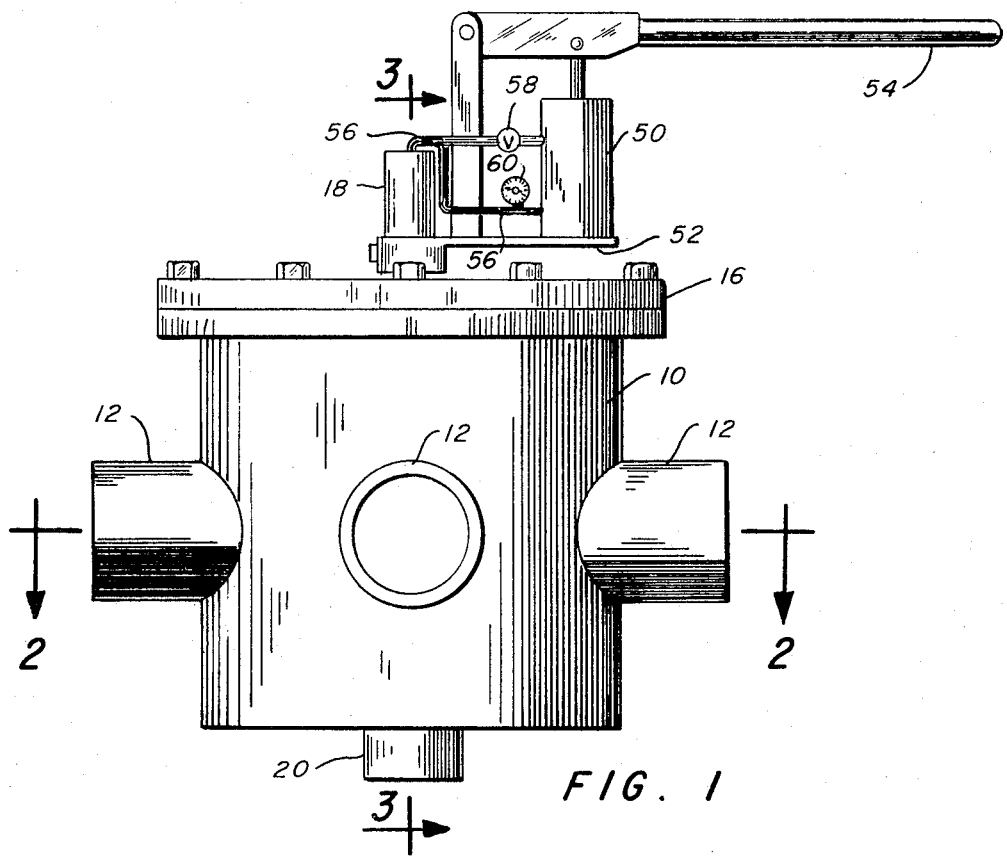
FIG. 1 is an external view of a multiport valve embodying this invention.

FIG. 1 shows the external appearance of an embodiment of the invention. It is to be understood that the invention is by no means limited to the specific embodiments set forth herein. The appearance of the valve embodying the invention may vary considerably. The embodiment shown in exterior view in FIG. 1 is representative of a multiport valve such as may be utilized in a meter proving system in the petroleum industry. The valve consists of a body 10 having a plurality of fluid ports 12. The cross-sectional view of FIG. 2 reveals four fluid ports communicating with the valve body. The valve body 10 includes an internal sealing surface 14 which, in the illustrated arrangement, is cylindrical. The upper end of the body 10 is closed by a flange 16 through which extends a shaft 18. The lower end of the body 10 includes a lower shaft receiving boss portion 20.

Figure 2:
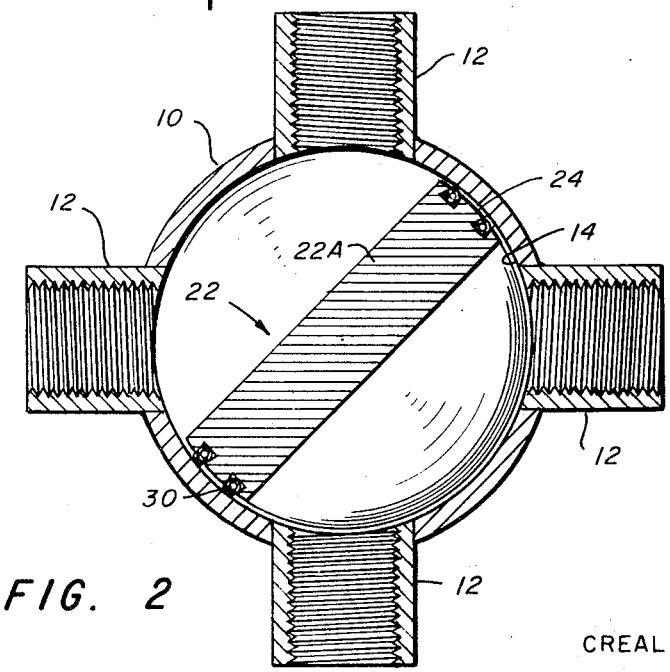
FIG. 2 is a cross-sectional view of the valve of FIG. 1 taken along the line 2—2 of FIG. 1.

Positioned within the body is a gate member 22, the configuration of the gate member being best shown in the isometric view of FIG. 4. The gate member 22 includes a vertical portion 22A, an upper semicircular horizontal portion 22B, and a lower semicircular horizontal portion 22C. The upper and lower portions 22B and 22C respectively extend perpendicular to the vertical portion 22A and in opposite directions. Formed on the gate member 22 is a continuous sealing surface 24 which extends along both edges of the gate member vertical portion 22A and the circumferential portions 22B and 22C. As shown in FIGS. 2 and 3 the gate sealing surface 24 is in close proximity to the body sealing surface 14.

FIG. 3 shows the gate member 22 in side view partially cut-away to reveal the cross-sectional arrangement. The gate member includes upper shaft 18 and a lower trunion 26, the shaft 18 and trunion 26 being coaxial with each other. Shaft 18 is received through opening 28 in flange 16 and the lower trunion 26 is received in the boss portion 20. Shaft 18 and lower trunion 26 are coaxial with the internal cylindrical surface 14 of body 10. The valve described to this point is essentially the same as that described in prior issued U.S. Pat No. 3,191,628 to which reference has previously been made. In the prior issued patent the resilient gasket material is positioned in the gate sealing surface 24 to resiliently engage at all times, the body cylindrical surface 14. Such arrangement functions satisfactorily, particularly in small sizes of the valve, except that very close machining and manufacturing tolerances are required to insure that sealing engagement is maintained at all times. In addition a major problem is that of providing sufficient resilient sealing engagement between the gates 22 and the body 10 so as to prevent leakage when the gate is in an operating position. To achieve leakproof contact between the gate and body means substantial friction may be encountered in moving the gate from one operating position to another. While this friction is tolerable in smaller valve sizes it becomes, in some instances, almost unmanageable in in larger valve sizes. In addition, to keep the friction level low enough for the gate to be moved from one position to another increases the chance that fluid leakage may occur. The valve of this invention is unique in the provision of an expanding seal to provide sealing between the gate member and the body internal sealing surface 14.

Formed in the gate sealing surface 24 are spaced apart grooves 30. While only one continuous groove is necessary to practice the teachings of the invention, in the illustrated embodiment there are two continuous grooves 30, each parallel with the other. The parallel grooves 30 are interconnected at one point by a passage 32 (see FIG. 5). Positioned in grooves 30 is a continuous length of resilient tubing 34 of rubber, either natural or synthetic, or of some other resilient plastic material. An axial passageway 36 is provided in shaft 18 from the upper end to the upper semicircular portion 22B (see FIG. 3). Upper and lower lateral passageways 38A and 38B extend from the shaft passageway 36 to grooves 30. As a manufacturing procedure lateral passageways 38A and 38B may be bored through the rearward surface of gate portion 22A and through the upper horizontal gate portion 22B. The portion of the lateral passageway 38 extending through the vertical gate portion 22A may be threaded and closed with bolts 40 as shown in FIGS. 3 and 4.

Tubing 34 is preferably of a single uninterrupted piece having one end 34A beginning in the upper lateral passageway 38A and extending throughout the parallel grooves 30, switching from one groove to the other through passageway 32, and terminating at the other end 34B in the lower lateral passageway 38B.

The tubing 34 is bonded at the ends 34A and 34B to the interior of the upper and lower lateral passageways 38A and 38B. Tubing 34 is arranged such that in non-inflated condition it does not engage the body internal sealing surface 14, but when pressure is applied, either hydraulically or pneumatically, through shaft passageway 38 and the lateral passageways 38A and 38B, the tubing is expanded to sealably engage the internal sealing surface 14.

In the preferred arrangement groove 30, having tubing 34 therein, is filled with a bondable elastomer. Many elastomer products which function satisfactorily for this purpose are commercially available such as Neoprene, Urathane, Viton and Teflon. Other types of bondable elastic material nonreactive with the fluid or gas which the valve is to handle now exists and more will likely be developed in the future. FIG. 7 shows the arrangement of a dovetail shaped groove 30 having tubing 34 therein and elastomer 42 surrounding the tubing within the groove 30. FIG. 7 shows in the upper groove the tubing 34 in a nonexpanded position in which the outer surface of the elastomer 42 is slightly displaced from the body sealing surface 14. In the lower groove 30 the tubing 34 is subject to internal hydraulic or pneumatic pressure and is expanded, causing the outer surface of the elastomer 42 to sealably engage body sealing surface 14. In the illustrated valve both the upper and lower tubings are subjected to hydraulic pressure at the same time and therefore both will expand or collapse at the same time. The arrangement in FIG. 7 is shown only to exemplify the movement of the tubing 34 and elastomer 42, to form sealing engagement with the valve body.

The elastomer is not shown in FIG. 5 to more fully reveal the configuration of the single length tubing 34 positioned in the paralleled grooves 30, but in the preferred embodiment the elastomer fills the grooves throughout and expands when pressure is applied to the tubing to form two uninterrupted paralleled seals.

The dovetail cross-sectional shape of grooves 30 in FIG. 7 is optional. The grooves may have parallel sides. The dovetail arrangement serves to increase the effectiveness in retaining the elastomer and tubing within the groove so that it is less likely to be inadvertently dislodged from the groove by the force of fluid or gas passing through the valve.

To insure that the tubing 34 is not closed as it turns the corner from upper and lower lateral passageways 38A and 38B, a short length of metallic tubing 44 may be inserted in the end of the tubing (see FIG. 6). The external diameter of metallic tubing 44 is preferably the same or less than the normal interior diameter of tubing 34 and is bent to provide the transition of the tubing 16 from the lateral passageway 38A and 38B to grooves 30. As shown in FIG. 6 the metallic tubing 44 may be flared on the end 44A.

It can be seen that resilient tubing 34 and elastomer 42 within groove 30 on the sealing surface 24 of the semispherical portions 22B and 22C are always in close proximity to the body internal sealing surface 14. Thus the possibility of the tubing and elastomer being dislodged from the grooves in the gate member is minimal. Along the vertical edges of the gate member vertical portion 22A, however, the situation is somewhat different. As the gate member passes an opening 12 in the body sealing surface 14 there is no adjacent body sealing surface to prevent the tubing 34 and elastomer 42 from becoming dislodged from the groove 30 in which they are positioned. Even though the elastomer is tightly bonded to the gate member the force of fluid or gas passing at a high velocity through the valve can exert great forces tending to dislodge the elastomer sealing member. To more securely hold the tubing and elastomer within the groove of the sealing surfaces of vertical portion 22A a Z-shaped rod 46 (see FIG. 8) may be positioned internally of the tubing 34. The external diameter of rod 46 is less than the normal internal diameter of tubing 34 so that the fluid or gas easily flows through the tubing to expand the tubing without interference from the rods 46. The Z-shaped rods 46 are positioned within tubing 34 between the dotted lines 48 shown in FIG. 4.

Many means may be provided for selectably applying hydraulic or pneumatic pressure to the interior of tubing 34. One arrangement, illustrated in FIG. 1, includes a hydraulic pump 50 supported on a bracket 52 extending from shaft 18. By means of a pivoted handle 54 pump 50 may be actuated to apply hydraulic pressure through tubing 56 to passageway 36 within shaft 18 and thence to the interior of the tubing 34.

A pressure release valve 58 allows hydraulic pressure to be released from the tubing when it is desired to move the gate from one position to another. Gauge 60 may be utilized to indicate the pressure applied to the resilient tubing.

The advantage of the arrangement of FIG. 1 is that all of the mechanism needed to move the gate member 22 and to expand the seals into sealing engagement with the body are contained in one apparatus. It can be seen that electric driven hydraulic pressure generating means may be utilized and that various mechanically or electrically operated valve arrangements for applying or removing pressure from the interior of tubing 34 may be provided.

In order to ascertain whether leakage exists past the gate member 22 a port opening 62 (see FIG. 3) may be provided in body 10 communicating between the grooves 30. A small valve 64 closes port 58. If leakage occurs past either resilient seal then pressure will occur to force fluid or gas out the valve 60, however, if no leakage exists such will be readily indicated by the lack of escape of fluid or gas from valve 60.

OPERATION

When an operator wishes to move the gate member 22 from one position to another pressure is removed from passageway 36 and thereby from within the interior of the tubing 34. This may be accomplished such as by opening the small bypass valve 58 shown in FIG. 1. Pressure drop within the tubing will be indicated by gauge 34. When pressure is relieved tubing 34 and the elastomer 42 collapses removing the sealing engagement with body sealing surface 14. This relieves all or substantially all of the frictional engagement between the gate 22 and body 10 permitting the gate to be easily moved to the desired position. When the new position is reached pressure may then be applied such as by actuation of handle 54, to expand the tubing 34 and thereby the elastomer 42 out into sealing engagement with the valve body. As long as this pressure exists within tubing 34 elastomer 42 is forced into sealed engagement with the body insuring leakproof engagement of the gate member with the body. Such leakproof engagement can be verified by the small valve 64.

The valve described fulfills the objects previously set forth for the invention. While the invention has been described with a certain degree of particularity it is manifest that many changes may be made in the details of construction and the arrangement of components without departing from the spirit and scope of the invention. It is understood that the invention is not limited to the embodiment set forth herein for the purposes of exemplification, but is to be limited only by the attached claim or claims, including the full range of equivalency to which each element or step thereof is entitled.

What is claimed:

1. A valve comprising:
   a body having an internal sealing surface and spaced apart port openings, the body having a shaft opening therein;
   a gate member rotatably supported in the body dividing the interior of the body into separate flow chambers and having a continuous gate sealing surface therearound in close proximity to the body sealing surface, and having a continuous groove in the gate sealing surface, the gate member having a shaft portion extending externally of said body through said shaft opening and having a passageway in said gate member communicating said groove with the exterior of the body by way of said shaft portion;
   an elongated expandable gasket member positioned in said groove in said gate sealing surface, the expandable gasket having communication with said passageway, said expandable gasket including a first resilient tubular portion received in said groove and a second elastomer portion overlying said resilient tubular portion and being bonded to said gate member; and
   means externally of said body of applying pressure by way of said passageway to said gasket member to expand said tubular portion and thereby said elastomer portion into engagement with said body sealing surface.

2. A valve according to claim 1 wherein said gate member has two spaced apart continuous grooves in said gate sealing surface, and wherein said expandable gasket member is positioned in both said grooves, and wherein said means externally of said body of applying pressure applies such pressure to said expandable gasket in both said grooves to expand said gaskets in both said grooves into engagement with said body sealing surface forming a continuous closed passageway between said body sealing surface and said gate member sealing surface.

3. A valve according to claim 2 including a small diameter test opening in said body communicating with said passageway formed by said spaced expandable gaskets between said body and gate member sealing surfaces.

4. A valve according to claim 3 wherein said test opening is normally closed by a small test valve exteriorly of said body.

5. A valve according to claim 2 wherein said spaced continuous grooves in said sealing surface include a gasket passageway therebetween, and wherein said expandable gasket member is a single, uninterrupted length of gasket member positioned in said spaced paralleled grooves and through said gasket passageway.

6. A valve according to claim 1 wherein said body internal sealing surface is cylindrical, said shaft opening being coaxial with said cylindrical body sealing surface.

7. A valve according to claim 1 wherein said body internal sealing surface is cylindrical, said shaft opening being coaxial with said cylindrical body sealing surface, and wherein said gate member is defined by a main portion substantially paralleling the cylindrical axis of said body sealing surface, a first semicircular wing portion extending from the main portion at one end thereof in a plane substantially perpendicular to the plane of the main portion, and a second semicircular wing portion extending from the main portion at the opposite end thereof in a plane substantially perpendicular to the plane of the main portion, the second wing portion extending in the direction opposite the first wing portion, the parallel sides of the main portion and the circular periphery of the first and second wing portions forming said continuous gate sealing surface, the same being in close proximity with the total circumference of said body cylindrical sealing surface.

8. A valve according to claim 7 wherein said gate member includes two spaced apart continuous grooves in said sealing surface, said continuous grooves being connected by a gasket passageway, and including a lateral passageway extending from each said groove to said passageway in said shaft, and wherein said expandable gasket member is a single uninterrupted length of gasket member positioned in said spaced parallel grooves and through said gasket passageway, and wherein one end of said gasket member is positioned in one of said lateral passageways, and the other end of said gasket member is positioned in the other of said lateral passageways.

9. A valve according to claim 1 wherein said expandable gasket includes a resilient tubular portion received in said groove, and including a metal tube of external diameter equal to or less than the internal diameter of said resilient tubular portion and being received in at least part of the length of said resilient tubular portion.

10. A valve according to claim 1 wherein said expandable gasket includes a resilient tubular portion received in said groove, and including a metal rod of external diameter less than the internal diameter of said resilient tubular portion and being received in a part of the length of said resilient tubular portion.

11. A valve according to claim 1 wherein said body has a plurality of spaced apart ports therein communicating with said body sealing surface and wherein said gate member divides the interior of said body into separate flow chambers whereby communication is provided between different ports according to the position of said gate member.

* * * * *